United States Patent
Kim

(10) Patent No.: US 10,277,680 B2
(45) Date of Patent: Apr. 30, 2019

(54) COMMUNICATION METHOD OF ELECTRONIC MODULE IN VEHICLE, AND VEHICLE INCLUDING THE ELECTRONIC MODULE

(71) Applicant: Hyundai Motor Company, Seoul (KR)

(72) Inventor: You Keun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 158 days.

(21) Appl. No.: 15/376,856

(22) Filed: Dec. 13, 2016

(65) Prior Publication Data

US 2018/0091597 A1    Mar. 29, 2018

(30) Foreign Application Priority Data

Sep. 23, 2016   (KR) .................. 10-2016-0122275

(51) Int. Cl.
```
G07C 5/00       (2006.01)
G07C 5/08       (2006.01)
H04W 4/02       (2018.01)
B60W 20/00      (2016.01)
H04L 12/40      (2006.01)
H04L 29/08      (2006.01)
```

(52) U.S. Cl.
CPC ............. *H04L 67/12* (2013.01); *B60W 20/00* (2013.01); *G07C 5/008* (2013.01); *G07C 5/0808* (2013.01); *H04L 12/40013* (2013.01); *H04W 4/023* (2013.01); *H04L 2012/40215* (2013.01)

(58) Field of Classification Search
CPC ............. H04L 67/12; H04L 12/40013; H04L 2012/40215; H04W 4/023; G07C 5/0808; G07C 5/008
See application file for complete search history.

(56) References Cited

U.S. PATENT DOCUMENTS 6,002,973 A * 12/1999 Giegold .................. G01C 22/02
                                                          180/177
2002/0188665 A1 * 12/2002 Lash .................. G06F 17/30902
                                                          709/203

(Continued)

FOREIGN PATENT DOCUMENTS

| JP | 2005-047488 A | 2/2005 |
| JP | 2013-038711 A | 2/2013 |
| KR | 10-2002-0096172 A | 12/2002 |

(Continued)

OTHER PUBLICATIONS

Salunkhe et al; Design and Implementation of CAN Bus Protocol for Monitoring Vehicle Parameters; May 20-21, 2016; 2016 IEEE Intl. Conf. on Recent Trends in Electronics; Bangalore, India; pp. 301-304 (Year: 2016).*

*Primary Examiner* — Michael J Zanelli

(74) *Attorney, Agent, or Firm* — Mintz Levin Cohn Ferris Glovsky and Popeo, P.C.; Peter F. Corless

(57) ABSTRACT

A vehicle includes: a first electronic module transmitting one data object of new data and comparison data indicating a difference between the new data and existing data when transmission of the new data is requested; a second electronic module receiving the comparison data, acquiring the new data from the comparison data, and controlling at least one operation of the vehicle based on the acquired new data; and a bus transferring data between the first electronic module and the second electronic module.

21 Claims, 16 Drawing Sheets

(56) References Cited

U.S. PATENT DOCUMENTS

2016/0112215 A1* 4/2016 Lee ................... H04L 12/4625
                                                        370/235
2016/0112216 A1* 4/2016 Sargent ................ H04L 12/66
                                                        370/328

FOREIGN PATENT DOCUMENTS

| KR | 10-0482611 B1 | 4/2005 |
| KR | 10-2008-0035439 A | 4/2008 |
| KR | 2011-0024216 A | 3/2011 |

* cited by examiner

| LOGIC VALUE | CAN CLASS B | | CAN CLASS C | |
|---|---|---|---|---|
| 0 | low | 1V | low | 1.5V |
|   | high | 4V | high | 3.5V |
| 1 | low | 5V | low | 2.5V |
|   | high | 0V | high | 2.5V |

DOMINANT      RECESSIVE

FIG. 7A

| Signal\Time | A | B | C | D | E | AMOUNT OF CHANGE | A | B | C | D | E |
|---|---|---|---|---|---|---|---|---|---|---|---|
| X SIGNAL $t_1$ | E3 | FF | 2 | 7 | 6E | X SIGNAL $t_1$ | – | – | – | – | – |
| Y SIGNAL $t_2$ | E3 | FF | 0 | 7 | 5F | Y SIGNAL $t_2$ | 0 | 0 | -2 | 0 | 0F |

FIG. 7B

| Bit / Byte | 7 | 6 | 5 | 4 | 3 | 2 | 1 | 0 |
|---|---|---|---|---|---|---|---|---|
| 1 | WHETHER THERE IS DIFFERENCE BETWEEN SIGNALS ||||| AMOUNT OF |||
| 2 | CHANGE OF SIGNAL C (3$^{RD}$ BYTE) ||||| AMOUNT OF |||
| 3 | CHANGE OF SIGNAL E (5$^{TH}$ BYTE) ||||| |||

FIG. 7C

| Bit / Byte | 7 | 6 | 5 | 4 | 3 | 2 | 1 | 0 |
|---|---|---|---|---|---|---|---|---|
| 1 | 0 | 0 | 1 | 0 | 1 | | | |
| 2 | -2[8bit] | | | | | | | |
| 3 | 0F[8bit] | | | | | | | |

FIG. 8A

| Byte \ Bit | 7 | 6 | 5 | 4 | 3 | 2 | 1 | 0 |
|---|---|---|---|---|---|---|---|---|
| 1 | 0 | 0 | 0 | 0 | 1 | 1 | 1 | 1 |

<AMOUNT OF CHANGE OF E AREA>

| Byte \ Bit | 7 | 6 | 5 | 4 | 3 | 2 | 1 | 0 |
|---|---|---|---|---|---|---|---|---|
| 1 | 1 | 0 | 0 | 0 | 0 | 0 | 1 | 0 |

<AMOUNT OF CHANGE OF C AREA>

FIG. 8B

| Byte \ Bit | 5 | 4 | 3 | 2 | 1 | 0 |
|---|---|---|---|---|---|---|
| 1 | 0 | 0 | 1 | 1 | 1 | 1 |

<AMOUNT OF CHANGE OF COMPRESSED E AREA>

| Byte \ Bit | 5 | 4 | 3 | 2 | 1 | 0 |
|---|---|---|---|---|---|---|
| 1 | 1 | 0 | 0 | 0 | 1 | 0 |

<AMOUNT OF CHANGE OF COMPRESSED C AREA>

FIG. 9

| CR0[bit] \ CR1[bit] | 1 | 0 |
|---|---|---|
| 1 | TRANSMIT ORIGINAL DATA | COMPRESSION RATIO OF 50% |
| 0 | COMPRESSION RATIO OF 25% | TRANSMIT ORIGINAL DATA |

COMMUNICATION METHOD OF ELECTRONIC MODULE IN VEHICLE, AND VEHICLE INCLUDING THE ELECTRONIC MODULE

CROSS-REFERENCE TO RELATED APPLICATION

This application claims the benefit of and priority to Korean Patent Application No. 10-2016-0122275, filed on Sep. 23, 2016 in the Korean Intellectual Property Office, the entire disclosure of which is incorporated herein by reference as if fully set forth herein.

BACKGROUND

1. Technical Field

Embodiments of the present disclosure relate generally to a communication method of an electronic module in a vehicle, and a vehicle including the electronic module, and more particularly, to a Controller Area Network (CAN) data bus for communication between electronic modules in a vehicle.

2. Description of the Related Art

With the recent development of vehicle-related technologies, many modern vehicles provide various functions intended to enhance user convenience, in addition to the usual driving function. Many vehicles include components or devices for performing such functions, and also include electronic modules for controlling the components or devices.

The electronic modules typically transmit and receive information to and from each other through a network. A Controller Area Network (CAN) data bus, for example, can be used in a vehicle network for data transmission and control between the electronic modules. That is, the electronic modules of the vehicle can perform various functions by transmitting and receiving data to and from each other through the CAN data bus.

However, as the number and variety of electronic components installed in a vehicle increase, the resulting bus load also increases, which causes signals for CAN communication to be delayed, resulting in deterioration of the control performance of the vehicle.

SUMMARY

It is an aspect of the present disclosure to provide a vehicle and an in-vehicle communication method capable of changing data included in a Controller Area Network (CAN) message to reduce network load without modifying hardware, resulting in stable control operation.

Additional aspects of the disclosure will be set forth in part in the description which follows and, in part, will be apparent from the description, or may be learned by practice of the disclosure.

In accordance with embodiments of the present disclosure, a vehicle includes: a first electronic module transmitting one data object of new data and comparison data indicating a difference between the new data and existing data when transmission of the new data is requested; a second electronic module receiving the comparison data, acquiring the new data from the comparison data, and controlling at least one operation of the vehicle based on the acquired new data; and a bus transferring data between the first electronic module and the second electronic module.

When there is no difference between the new data and the existing data, the second electronic module may control the at least one operation of the vehicle based on the existing data.

The first electronic module may calculate the difference between the new data and the existing data.

The first electronic module may create the comparison data to include information indicating whether there is a difference between the new data and the existing data and information indicating an amount of the difference when the difference exists.

The information indicating whether there is a difference between the new data and the existing data and the information indicating the amount of the difference may be stored in a predetermined data field in the comparison data.

The first electronic module may determine a size of the comparison data according to the amount of the difference.

The first electronic module may create the comparison data to include a control register determined according to the amount of the difference.

The second electronic module may interpret the comparison data including the control register to acquire the new data.

Each of a data field of the new data, a data field of the existing data, and a data field of the comparison data may be a maximum of 64 bits.

When the comparison data may be transmitted by the first electronic module a predetermined number of times or more, the first electronic module transmits the new data.

Furthermore, in accordance with embodiments of the present disclosure, an electronic module includes: a communication unit communicating with an external electronic module through an in-vehicle communication network; and a controller transmitting one data object of new data and comparison data indicating a difference between the new data and existing data when transmission of the new data is requested.

The controller may interpret the comparison data to acquire the new data, and control the at least one operation of a vehicle based on the acquired new data.

When there is no difference between the new data and the existing data, the controller may control the at least one operation of the vehicle based on the existing data.

The controller calculate the difference between the new data and the existing data.

The controller may create the comparison data to include information indicating whether there is a difference between the new data and the existing data and information indicating an amount of the difference when the difference exists.

The information indicating whether there is a difference between the new data and the existing data and the information indicating the amount of the difference may be stored in a predetermined data field in the comparison data.

The controller may determine a size of the comparison data according to the amount of the difference.

The controller module may create the comparison data to include a control register determined according to the amount of the difference.

The controller may interpret the comparison data including the control register to acquire the new data.

When comparison data is transmitted by the controller a predetermined number of times or more, the controller may transmit the new data.

Each of a data field of the new data, a data field of the existing data, and a data field of the comparison data may be a maximum of 64 bits.

Furthermore, in accordance with embodiments of the present disclosure, a communication method in a vehicle includes: transmitting, by a first electronic module, one data object of new data and comparison data indicating a difference between the new data and existing data when transmission of the new data is requested; receiving, by a second electronic module, the comparison data; acquiring, by the second electronic module, the new data from the comparison data; and controlling, by the second electronic module, at least one operation of the vehicle based on the acquired new data. Data is transferred between the first electronic module and the second electronic module using a bus.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 7A, 7B, and 7C are structure diagrams of data according to embodiments of the present disclosure.

FIG. 8A and 8B are tables for describing a method of compressing data, according to embodiments of the present disclosure.

FIG. 9 is a table for describing a control register according to embodiments of the present disclosure.

Figure 1:
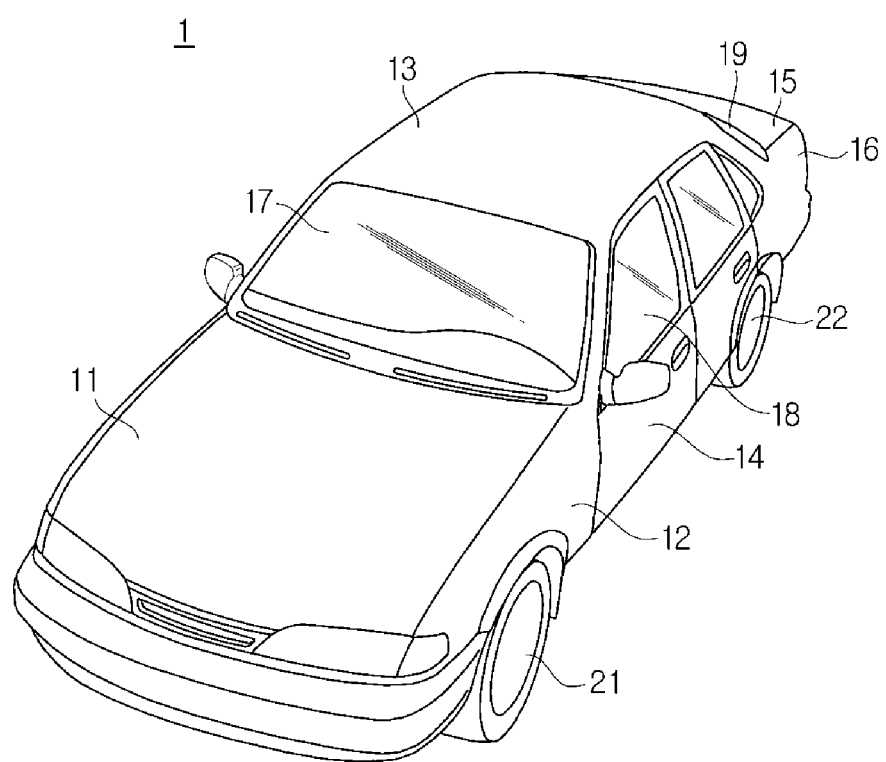
FIG. 1 shows an outer appearance of a vehicle according to embodiments of the present disclosure

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Configurations illustrated in the embodiments and the drawings described in the present specification are only the embodiments of the present disclosure, and thus it is to be understood that various modified examples, which may replace the embodiments and the drawings described in the present specification, are possible when filing the present application.

The terms used in the present specification are for describing embodiments and not for limiting or restricting the present disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

It will also be understood that, although the terms first, second, etc. may be used herein to describe various components, these components should not be limited by these terms. These terms are only used to distinguish one component from another. As further used herein, the terms "unit", "device, "block", "member", or "module" refers to a unit that can perform at least one function or operation.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in detail with reference to the appended drawings.

FIG. 1 shows an outer appearance of a vehicle according to embodiments of the present disclosure. As shown in FIG. 1, a vehicle 1 according to embodiments of the present disclosure may include a body 11 to 16 forming the outer appearance of the vehicle 1, a chassis (not shown) configured to support components of the vehicle 1, and a plurality of wheels 21 and 22 configured to move the body 11-16 and the chassis.

The wheels 21 and 22 may include front wheels 21 provided in the front portion of the vehicle 1, and rear wheels 22 provided in the rear portion of the vehicle 1, and the vehicle 1 may move forward or backward by rotations of the wheels 21 and 22.

The body 11 to 16 may include a hood 11, front fenders 12, a roof panel 13, doors 14, a trunk lid 15, and quarter panels 16.

Also, the body 11 to 16 may include a front window 17 provided in the front part, side windows 18 installed in the doors 14, and a rear window 19 provided in the rear part.

It should be understood that the exterior configuration of the vehicle 1 described herein and depicted in FIG. 1 is provided merely for the purposes of demonstration and does not limit the scope of the present disclosure. Thus, the exterior configuration of the vehicle 1 may be modified in any suitable manner limited only by the claims defined herein.

Figure 2:
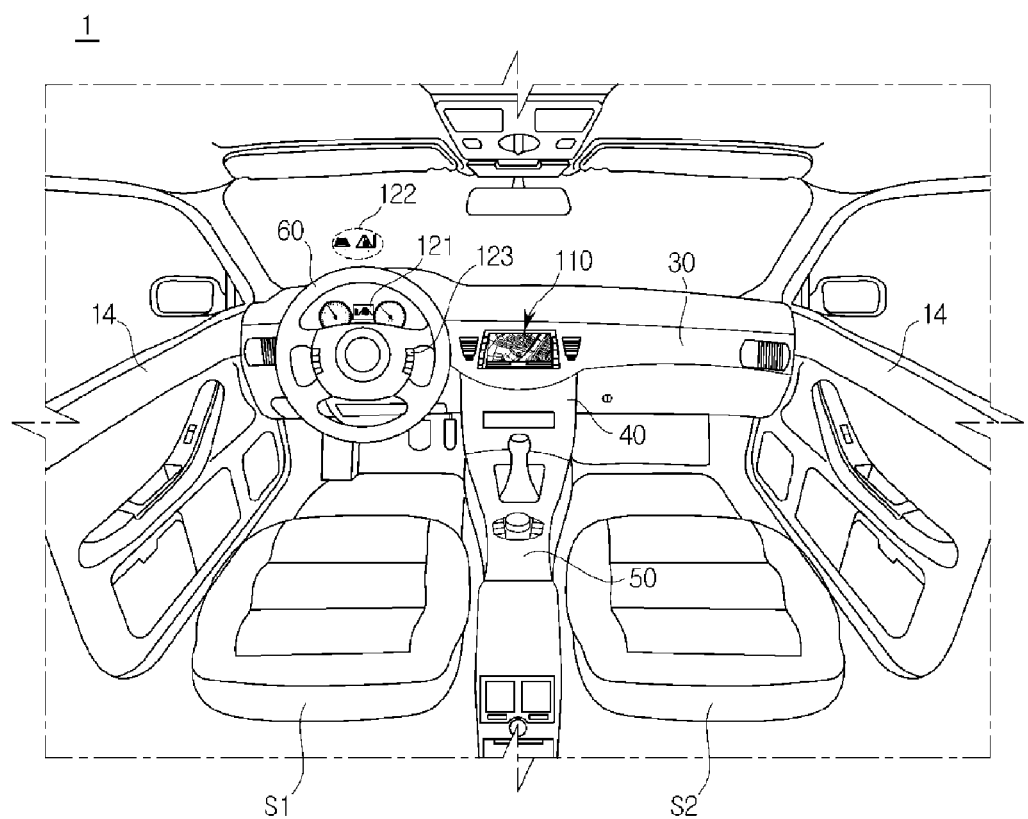
FIG. 2 shows the interior of a vehicle according to embodiments of the present disclosure.

FIG. 2 shows the interior of a vehicle according to embodiments of the present disclosure. As shown in FIG. 2, in the inside of the body 11 to 16, a plurality of seats S1 and S2 in which passengers sit, a dash board 30 which controls operations of the vehicle 1 and on which various meters for displaying driving information of the vehicle 1 are provided, a center fascia 40 on which a control panel for allowing a user to manipulate attached devices included in the vehicle 1 is provided, a center console 50 in which a gear stick, a parking brake stick, and the like are provided, and a steering wheel 60 to enable a user to manipulate a heading direction of the vehicle 1 may be provided.

The seats S1 and S2 may allow a driver to manipulate the vehicle 1 at a comfortable, stable position, and may include a driver seat S1 in which the driver sits, a passenger seat S2 in which a passenger sits, and a back seat (not shown) that is provided in the back part inside the vehicle 1.

The dash board 30 may include various meters, such as a speedometer, a fuel gauge, an automatic transmission selection lever lamp, a tachometer, and a trip meter, to display driving-related information.

The center fascia 40 may be positioned between the driver seat S1 and the passenger seat S2, and may include a manipulation unit for controlling an audio system, an air conditioner, and a heater, a ventilator of the air conditioner to adjust the inside temperature of the vehicle 1, and a cigar jack.

The center console 50 may be positioned below the center fascia 33 between the driver seat S1 and the passenger seat S2, and in the center console 50, a gear stick for shifting gears, a parking brake stick for parking, and the like may be installed.

The steering wheel 60 may be attached on the dash board 30 in such a manner to be rotatable with respect to a steering axis. In order to change a heading direction of the vehicle 1, a driver may rotate the steering wheel 60 in a clockwise or counterclockwise direction.

The chassis (not shown) may include a power generating system (for example, an engine or a motor) that burns fuel to generate power for moving the vehicle 1, a fuel supplying system to supply fuel to the power generating system, a cooling system to cool the power generating system, an exhaust system to exhaust gas generated by burning fuel, a power transfer system to transfer power generated by the power generating system to the wheels 21 and 22, a steering system to transfer information about a heading direction of the vehicle 1 manipulated by the steering wheel 40 to the wheels 21 and 22, a brake system to stop rotating the wheels 21 and 22, and a suspension system to absorb vibrations of the wheels 21 and 22 according to road conditions.

It should be understood that the interior configuration of the vehicle 1 described herein and depicted in FIG. 2 is provided merely for the purposes of demonstration and does not limit the scope of the present disclosure. Thus, the interior configuration of the vehicle 1 may be modified in any suitable manner limited only by the claims defined herein FIG. 3 is a block diagram of a vehicle including a first electronic module and a second electronic module, according to embodiments of the present disclosure.

Figure 3:
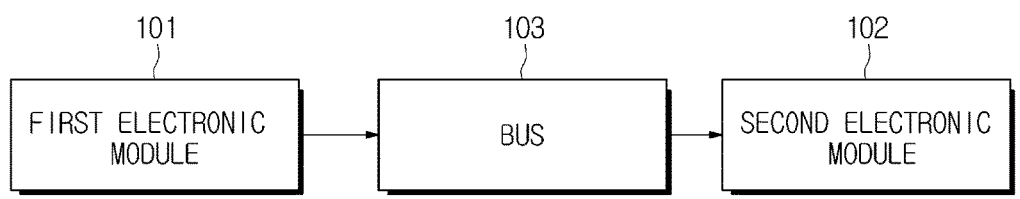
FIG. 3 is a block diagram of a vehicle including a first electronic module and a second electronic module, according to embodiments of the present disclosure.

As shown in FIG. 3, a first electronic module 101 and a second electronic module 102 may transmit/receive data to/from each other through a bus 103. Examples of the first electronic module 101 and the second electronic module 102 are shown as electronic modules 100 in FIG. 5, which will be described later. Data transmitted/received by the first electronic module 101 and the second electronic module 102 may include data related to the speed of the vehicle 1, data related to the RPM of the engine, data related to the pressure of the fuel tank, data related to the excel pedal, data related to the transmission, and data related to the handle.

The first electronic module 101 may transmit a signal to the second electronic module 102 at regular time intervals. In the following description, a signal that the first electronic module 101 transmits at a non-specific time will be referred to as existing data, and data required to be transmitted after the non-specific time will be referred to as new data. A case in which new data is required to be transmitted may be a case in which the first electronic module 101 receives another data object from an external device or receives a control command from a user. Also, the existing data does not mean specific data, but mean data transmitted before new data is transmitted. Data transmission/reception between general electronic modules may be performed by operation of transmitting existing data and then transmitting new data. However, according to embodiments of the present disclosure, the first electronic module 101 may transmit comparison data based on a difference between existing data and new data, instead of transmitting the new data.

Since the first electronic module 101 transmits the comparison data, the first electronic module 101 may transmit no data for an unchanged part of a data field so that the first electronic module 101 can perform data transmission with a smaller amount of data than the case of transmitting new data. Meanwhile, after the first electronic module 101 transmits comparison data a predetermined number of times or more, the first electronic module 101 may transmit new data for the accuracy of data transmission, and if there is no difference between the new data and the existing data, the first electronic module 101 may transmit no data. Also, if a value of the comparison data is greater than a predetermined value, the first electronic module 101 may transmit the new data. The predetermined value may be the size of the new data. However, the predetermined value may be set by a user. A method of configuring comparison data will be described in detail, later.

The second electronic module 102 may receive existing data from the first electronic module 101. As described above, for data transmission between the first electronic module 101 and the second electronic module 102, the bus 103 may be used. Thereafter, the second electronic module 102 may receive comparison data, and interpret the comparison data and the existing data to acquire new data that the first electronic module 102 has intended to transmit. In this way, the same result can be obtained by transmitting and receiving a smaller amount of data (e.g., one data object) than new data. A method of acquiring new data based on comparison data and existing data will be described in detail, later. The second electronic module 102 may control at least one operation of the vehicle 1 based on the acquired new data. Meanwhile, if the first electronic module 101 transmits new data, operation of acquiring new data may be not needed so that the operation of the vehicle 1 can be controlled by the new data. If the first electronic module 101 transmits no data since there is no difference between the new data and the existing data, the second electronic module 102 may control the operation of the vehicle 1 based on the existing data.

Figure 4:
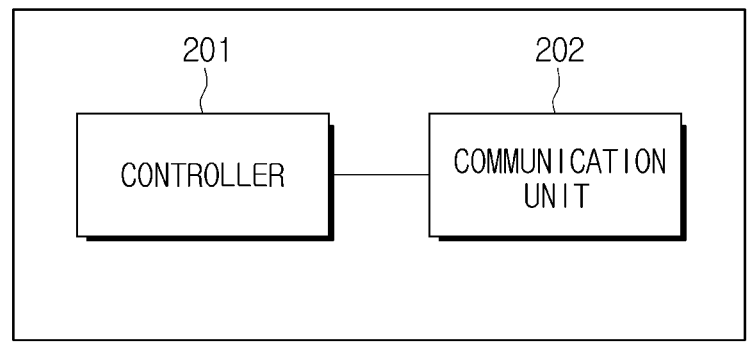
FIG. 4 is a block diagram of an electronic module according to embodiments of the present disclosure.

FIG. 4 is a block diagram of an electronic module according to embodiments of the present disclosure.

As shown in FIG. 4, an electronic module 100 may include a controller 201 and a communication unit 202.

The communication unit 202 may transmit/receive data to/from various devices installed in the vehicle 1 through an in-vehicle communication network. For example, the various devices may include all devices installed in the vehicle 1, such as a display, a Time Measurement Unit (TMU), an external amplifier, and a head unit, although not limited to these.

The in-vehicle communication network means a communication network for enabling data transmission/reception between the devices installed in the vehicle 1. According to embodiments of the present disclosure, the communication unit 202 may transmit/receive data to/from the devices installed in the vehicle 1 through a Controller Area Network (CAN).

The CAN which will be described later may be a vehicle network for providing digital serial communication between various control devices of the vehicle 1. The CAN may substitute serial communication lines for the complex electrical wirings and relays of the electronic components installed in the vehicle 1 to provide real-time communication. The CAN will be described in detail with reference to FIG. 6, later. However, the in-vehicle communication network is not limited to the CAN, and the communication unit 202 may transmit/receive data to/from the devices installed in the vehicle 1 through various communication networks that can be used in the vehicle 1.

The controller 201 may configure comparison data from existing data and new data, and acquire the new data based on the existing data and the comparison data. The controller 201 may include a memory to store programs for performing the above-described operations and operations which will be described later and various kinds of data related to the programs, a processor to execute the programs stored in the memory, a Micro Controller Unit (MCU), etc. Also, the controller 201 may be integrated into System On Chip (SOC) installed in the vehicle 1, and operated by the processor. However, if the vehicle 1 includes a plurality of SOCs, the controller 201 may be integrated into the plurality of SOCs. Meanwhile, the controller 201 may include or be coupled to at least one type of storage medium among a flash memory type, a hard disk type, a multimedia card micro type, card type memory (e.g., Secure Digital (SD), eXtreme Digital (XD) memory, etc.), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, an optical disk, and the like. However, the controller 201 is not limited to the above-mentioned devices, and may be implemented as any other type of storage medium well-known to those skilled in the art.

Figure 5:
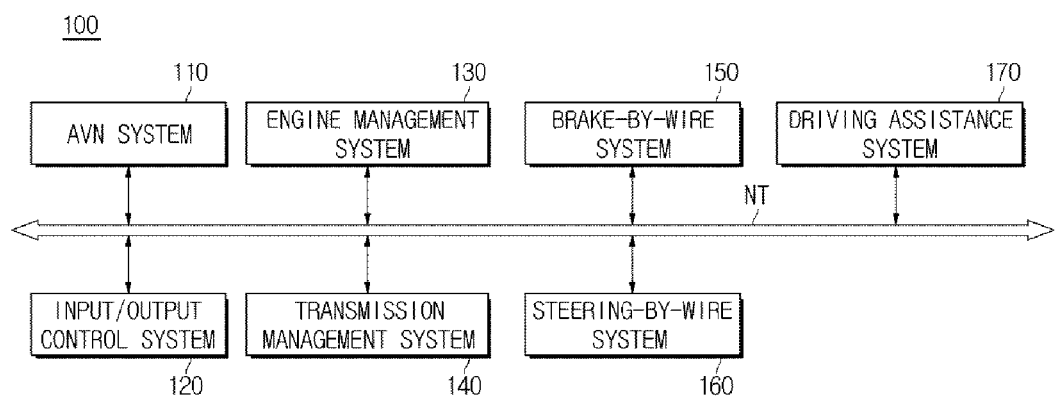
FIG. 5 shows various kinds of electronic modules included in a vehicle according to embodiments of the present disclosure.

FIG. 5 shows various kinds of electronic modules included in a vehicle according to embodiments of the present disclosure.

Electronic modules 100 shown in FIG. 5 may be examples of the first electronic module 101 and the second electronic module 102 described above. More specifically, the vehicle 1 may include an Audio/Video/Navigation (AVN) system 110, an input/output control system 120, an Engine Management System (EMS) 130, a Transmission Management System (TMS) 140, a brake-by-wire system 150, a steering-by-wire system 160, and a driving assistance system 170. However, the electronic modules 100 shown in FIG. 5 are only a part of electronic modules included in the vehicle 1, and the vehicle 1 may further include other electronic modules.

Also, the electronic modules 100 included in the vehicle 1 may communicate with each other through a vehicle communication network NT. The vehicle communication network NT may adopt a communication standard, such as Media Oriented Systems Transport (MOST) having communication speed of maximally 24.5 Mbps (Mega-bits per second), FlexRay having communication speed of maximally 10 Mbps, Controller Area Network (CAN) having communication speed from 125 kbps (kilo-bits per second) to 1 Mbps, and Local Interconnect Network (LIN) having communication speed of 20 kbps. The vehicle communication network NT may adopt one or more communication standards of MOST, FlexRay, CAN, and LIN.

The AVN system 110 is a system to output audio or video according to a driver's control command. More specifically, the AVN system 110 may reproduce audio or video or guide a path to a destination, according to a driver's control command.

The input/output control system 120 may receive a driver's control command input through a button, and display information corresponding to the driver's control command. The input/output control system 120 may include a cluster display 121 mounted on the dash board 30 to display images, a Head-Up Display (HUD) 122 to project images on the wind screen 17, and a button module 123 installed in the steering wheel 60.

The cluster display 121 may be disposed on the dash board 30 to display images. More specifically, the cluster display 121 may be disposed adjacent to the wind screen 17 so that a driver can acquire operation information of the vehicle 1, information about roads, or a driving route as long as the driver's eyeline does not greatly deviate from the front of the vehicle 1. The cluster display 121 may adopt a Liquid Crystal Display (LCD) panel or an Organic Light Emitting Diode (OLED) panel.

The HUD 122 may project an image on the wind screen 17. The image projected on the wind screen 17 by the HUD 122 may include operation information of the vehicle 1, information about roads, or a driving route.

The EMS 130 may perform fuel injection control, fuel ratio feedback control, lean burn control, ignition timing control, and idle speed control. The EMS 130 may be a single system or a plurality of systems connected to each other through communication.

The TMS 140 may perform shift control, damper clutch control, pressure control upon turning on/off a friction clutch, and engine torque control during transmission. The TMS 140 may be a single system or a plurality of systems connected to each other through communication.

The brake-by-wire system 150 may control the brake of the vehicle 1. The brake-by-wire system 150 may include an Anti-lock Brake System (ABS).

The steering-by-wire system 160 may reduce a steering force upon low speed driving or parking, and increase a steering force upon high speed driving to thereby assist a driver's steering manipulations.

The driving assistance system 170 may assist driving of the vehicle 1, and may perform a front collision avoidance function, a lane departure warning function, a blind spot detection function, and a rear-view monitoring function. The driving assistance system 170 may include a plurality of devices connected to each other through communication. For example, the driving assistance system 170 may include a Forward Collision Warning System (FCW) to sense a vehicle running ahead on the same lane to avoid collision with the vehicle, an Advanced Emergency Braking System (AEBS) to relieve, when collision with a front vehicle is unavoidable, the shock of the collision, an Adaptive Cruise Control (ACC) to sense a vehicle running ahead on the same lane to automatically accelerate/decelerate according to the speed of the vehicle, a Lane Departure Warning System (LDWS) to prevent departure from the driving lane, a Lane Keeping Assist System (LKAS) to control, if it is determined that the vehicle 1 departed from the driving lane, the vehicle 1 to return to the driving lane, a Blind Spot Detection (BSD) system to provide a driver with information about a vehicle located in a blind spot, and a Rear-end Collision Warning (RCW) system to sense a vehicle running behind on the same lane to avoid collision with the vehicle.

Figure 6A:
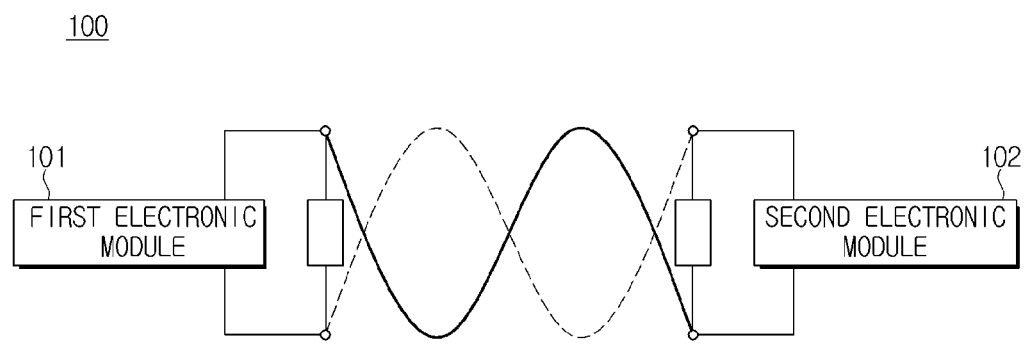
FIGS. 6A, 6B, and 6C are views for describing a CAN data bus.
Figure 6B:
Figure 6B:
Figure 6C:
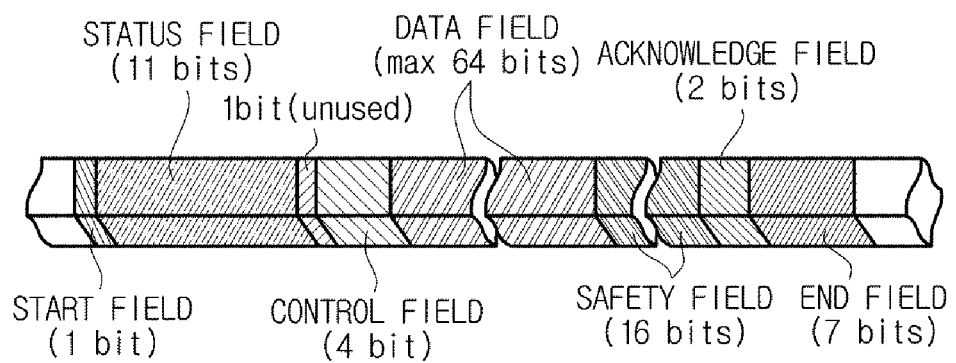

FIGS. 6A, 6B, and 6C are views for describing a CAN data bus. The following description will be given with reference to FIGS. 6A, 6B, and 6C together in order to avoid duplication of description.

As described above, the plurality of electronic modules 100 installed in the vehicle 1 may use the CAN to transmit and receive data. The CAN may be also referred to as a controller area network or a CAN-data bus.

FIG. 6A schematically shows a configuration of a CAN data bus. Referring to FIG. 6A, the first electronic module 101 and the second electronic module 102 may be respectively included in at least two modules of the electronic modules 100. The CAN may transmit data through two stands of data lines twisted or shielded by sheathes. The CAN operates according to a multi-master principle in which a plurality of Engine Control Units (ECUs) function as a master in a master/slave system.

The CAN is classified into class B and class C, wherein the maximum data rate of the class B is 125 kBd, and the maximum data rate of the class C is 1 MBd. Also, a CAN data bus system transmits data using two lines. The CAN class B has suitability against single line, and the CAN class C has no suitability against single line.

Herein, the suitability against single line is that although one line is disconnected or shorted in the CAN data bus system, the other line maintains communication capability as it is. However, if the bus system changes to a single line mode, interference immunity is no longer ensured. That is, in some cases, a malfunction may occur.

Referring again to FIG. 6A, the CAN data bus system may be configured with two nodes, two terminal resistors, a CAN-high line, and a CAN-low line.

More specifically, nodes means a plurality of stations constituting a bus system, and in the present disclosure, the nodes may mean the first electronic module 101 and the second electronic module 102. That is, the nodes may be included in at least two electronic modules 100 selected from among the above-mentioned electronic modules 100.

Thus, in FIG. 6A, the first electronic module 101 and the second electronic module 102 are shown as two nodes. The first electronic module 101 and the second electronic module 102 may transmit and receive data by a communication method which will be described later.

Meanwhile, bus lines may include the CAN-high line and the CAN-low line. If Udom is formed in the CAN-high line by a transceiver of the node, the voltage of the CAN-high line may rise. Simultaneously, the voltage of the CAN-low line may fall. At this time, a logic value may be "0". That is, the CAN-high line and the CAN-low line may be twisted or shielded by a wire mesh.

That is, magnetic fields formed by the CAN-high line and the CAN-low line may be cancelled since the voltages change in opposite directions whenever switching occurs. Accordingly, the CAN-high line and the CAN-low line may be electronically neutral with respect to the outside so as to cause no external interference. Thus, resistance against interference can be ensured.

Referring to FIG. 6B, the above-mentioned logic value may be classified according to CAN class. For example, if the CAN-low line is 1V and the CAN-high line is 4V in the CAN class B, this may correspond to a logic value "0". In contrast, if the CAN-low line is 5V and the CAN-high line is 0V in the CAN class B, this may correspond to a logic value "1". However, the voltage values are not limited to these, and may vary.

Referring again to FIG. 6A, the terminal resistors may connect circuits between the CAN-high line and the CAN-low line. Thereby, the terminal resistors may prevent the generation of reflection in the CAN-bus lines.

CAN-bus lines having no terminal resistor may cause a malfunction, particularly, in the CAN class C. In the CAN class C, terminal resistance may be tested at contacts of CAN lines using a resistance meter.

As described above, the CAN operates according to the multi-master principle. The multi-master principle does not mean Point-To-Point communication but means multiplex communication. That is, the multi-master principle means system in which a plurality of nodes are connected to each other, not via a central node. Accordingly, each node, that is, electronic module, can transmit a message to a bus line unless information is being transmitted or received through the bus line.

If the plurality of electronic modules 100 try to transmit messages simultaneously, important one of the messages may be first transmitted through arbitration. That is, arbitration means operation of controlling access to a data bus line when the plurality of electronic modules 100 try to transmit messages simultaneously.

Accordingly, the importance or priority of messages required for arbitration may be defined by Identifiers (IDs). As a message has the lower ID, it may have the higher priority.

FIG. 6C is a view for describing a configuration of a data protocol used in the CAN. Referring to FIG. 6C, generally, a data protocol may be configured with a start field, a status field, a control field, a safety field, and an acknowledge field.

The start field (1 bit) may represent a start of a message, and function to inform a node that the message starts being transmitted. That is, the electronic module 100 may be synchronized when the start field is transmitted.

The status field (11 bits) may be configured with a message ID (e.g., a message logic symbol). That is, nodes may check the content of the message based on the ID. Also, which sender has to first transmit, that is, arbitration may be executed based on the ID.

The control field, the safety field, and the acknowledgement field may be used to ensure the transmission of data.

A node (also referred to as a "sender node") which has transmitted a message may receive a feedback about whether the message has been correctly read out from another node (also referred to as a "receiver node") which has received the message, and the acknowledge field may be used to provide such a feedback.

If no acknowledgement is received, the message may be repeatedly transmitted. If no acknowledge is received from the receiver node even after the message has been repeatedly transmitted a predetermined number of times, the sender node may stop transmitting the message. Accordingly, although a node fails, the entire bus system can be prevented from failure. The control field may be configured with 6 bits, the safety field may be configured with 16 bits, and the acknowledge field may be configured with 2 bits.

An end field (7 bits) may indicate the end of the message, and change the bus to a standby state for the next message.

Finally, a data field (maximum 64 bits) may include valid data of the message, that is, substantial data that is transmitted from each node.

Figure 7C:
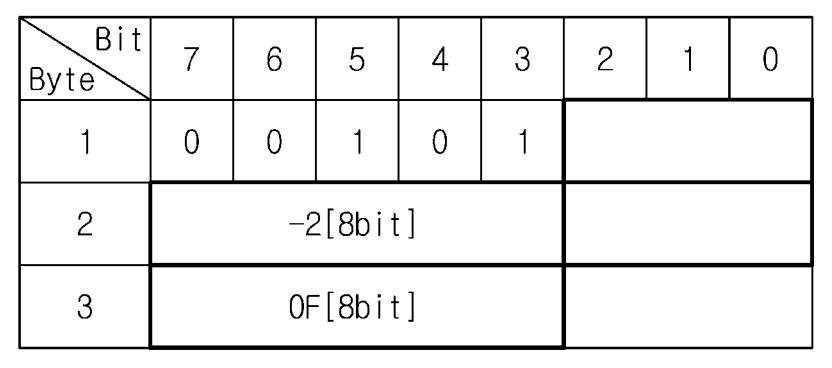

FIGS. 7A, 7B, and 7C are structure diagrams of data according to assistance of the present disclosure.

Referring first to FIG. 7A, a signal that is transmitted/received in a general CAN is shown. A data structure shown in FIG. 7A represents data that the first electronic module 101 and the second electronic module 102 shown in FIG. 3 transmit and receive through the bus 103. An alphabet on the horizontal axis represents data of 1 byte, that is, 8 bits. A time on the vertical axis represents a time at which data is transmitted. For description, a signal transmitted at t1 among signals shown in FIG. 7A will be referred to as an X signal, and a signal transmitted at t2 will be referred to as a Y signal. Each of the X and Y signals shown in FIG. 7A may be configured with 5 bytes.

Although the operation of the vehicle 1 can be controlled by transmitting the X signal and then transmitting the Y signal, transmitting the signals of 5 bytes may overload the bus 103. Accordingly, in assistance of the present disclosure, a method of transmitting a signal corresponding to a difference between the X signal and the Y signal, instead of transmitting the entire of the Y signal, may be used. In the areas of alphabets A, B, and D, there is no difference between the X signal and the Y signal, and in the areas of alphabets C and E, there is a difference between the X signal and the Y signal. More specifically, in the area of alphabet C, the X signal has a value of 2 and the Y signal has a value of 0. Accordingly, in the area of alphabet C, there is a difference value of 2 between the X signal and the Y signal. Meanwhile, in the area of alphabet E, the X signal has a value of 6E and the Y signal has a value of 5F. In the current embodiment, since hexadecimal using 8 bits is applied, the difference between the X signal and the Y signal becomes F (F=6E−5F). The F value corresponds to a value of 15 in decimal. Referring to FIG. 7A, in Table related to the amount of change, −2 is written in C, and F is written in E.

FIG. 7B is a table for describing a method for representing the values of FIG. 7A on a data field.

FIG. 7B shows a data field corresponding to 3 bytes. That is, the vertical axis of FIG. 7B includes three rows, wherein each row can represent data of 1 byte. In FIG. 7B, the first 5 bits of the first row may store information indicating whether there is a difference between the X signal and the Y signal. That is, since the X signal and the Y signal are data corresponding to 5 bytes, whether data of the corresponding bytes has changed can be represented with 5 bits. If data has changed, 1 may be written, and if no data has changed, 0 may be written. In the case of the X signal and the Y signal, since data has changed in the C and E areas corresponding to the third and fifth areas, the 5th bit digit and the 3rd bit digit of 1 byte corresponding to the first row may have a value of 1. Accordingly, locations at which data has changed between the X signal and the Y signal can be determined based on data values from the 7th bit to the $3^{rd}$ bit of the first row. In FIG. 7A, for easy understanding, data of 5 bytes is described, however, the size of data is not limited. After whether data has changed is represented, the amount of change of each data may be represented on the data field. Accordingly, −2 corresponding to the amount of change of the area of alphabet C and F corresponding to the amount of change of the area of alphabet E may be written in order. In FIG. 7B, the amount of change is represented with the size of 8 bits, however, the amount of change can be highly compressed by another method which will be described later. By the above-described method, the first electronic module 101 may create and transmit comparison data based on the amount of change. The comparison data can be reconfigured through a compression method which will be described later. Referring to FIG. 7C, −2 corresponding to the amount of change of the C area may be written in the second row of the data field, and F corresponding to the amount of change of the E area may be written in the third row of the data field.

FIGS. 8A and 8B are tables for describing a method of compressing data, according to embodiments of the present disclosure.

Referring to FIGS. 7A-8B, in the case of the X signal and the Y signal, data corresponding to the area of alphabet C and data corresponding to the area of alphabet E are changed by −2 and F, respectively. In order to represent the amount of change on the data field, information about whether an increase or decrease occurs, and the absolute value of the amount of change need to be written.

In FIGS. 8A and 8B, the first bit may represent the sign of the amount of change. More specifically, the first bit may represent data about the amount of change of FIG. 7B. The first bit may be used to write 0 if the amount of change is a positive number and to write 1 if the amount of change is a negative number. The following bits may be used to write the amount of change. If all of the 8 bits are used since the amount of change is great, there is no difference between the size of comparison data based on the amount of change and the size of the new data, and accordingly, the new data may be transmitted, which will be described later. Also, the new data may be transmitted according to a predetermined size, without creating comparison data. Referring to FIG. 8A, there is no data value from the second bit to the fourth bit. If all of the 8 bits are used to represent F and −2 corresponding to the differences between the X signal and the Y signal, a data transfer rate may increase so that the effect of the present disclosure cannot be maximized. Accordingly, operation of compressing data may be needed.

Comparing FIG. 8A to FIG. 8B, FIG. 8A shows data of 8 bits, and FIG. 8B shows data of 6 bits. Since F corresponding to the amount of change of data included in the E area can be represented as a binary number 1111, F can be represented with 5 bits including a sign. However, in the current embodiment, F is represented with 6 bits, instead of 5 bits, for the uniformity of a compression ratio. Data of 6 bits is compressed data that is 25% smaller than data of 8 bits. Since data corresponding to F is 25% compressed, data of −2 that is the amount of change corresponding to the C area may also be represented with 6 bits 25% compressed for the uniformity of the data field shown in FIGS. 7A-7C. That is, a compression ratio may be decided in consideration of data having a greatest amount of change. The data shown in FIGS. 7A-8B may be data having a compression ratio of 25%. The compression ratio may be represented using a control register which will be described later.

As a result, by transmitting data of 3 bytes corresponding to the difference between the X signal and the Y signal, instead of transmitting data of the Y signal of 5 Bytes, it is possible to reduce a data transfer rate.

The method and numerals shown in FIGS. 7A-8B are examples for describing the present disclosure, and a method of creating reconfigured data based on the amount of change is not limited to this.

FIG. 9 is a table for describing a control register according to an embodiment of the present disclosure.

The control register is a register for controlling a predetermined function of a currently operating mode. In the present disclosure, the control register is used to perform control operation related to the above-described compression rate. The control register may be included in the control field shown in FIG. 6C.

As shown in FIG. 9, in the control register, CR0 and CR1 may be used to represent a compression ratio. The first electronic module 101 may decide a compression ratio according to the above-described method, and transmit a signal including a control register having information of the compression ratio. If the second electronic module 102 receives the signal, the second electronic module 102 may recognize the compression ratio based on the control register included in the signal to estimate original data. That is, the control register may function as a guide for decompressing compressed data.

In FIG. 9, a compression ratio of 25% and a compression ratio of 50% are shown. As described above, according to an embodiment of the present disclosure, a compression ratio may be decided in consideration of data having a greatest amount of change. The compression ratio of 25% and the compression ratio of 50% are examples for description, and a compression ratio is not limited to these values. The CR0 and CR1 are registers each having 1 bit. The CR0 and CR1 may each have a value of 0 or 1, and may be controlled to totally four cases. The case in which CR1=1 and CR0=1 may correspond to when comparison data has been transmitted a predetermined number of times, or when existing data and new data exceed a predetermined value. In this case, the new data, instead of comparison data, may be transmitted. The case in which CR1=0 and CR0=1 may correspond to when data having a compression ratio of 50% is transmitted, and the case in which CR1=1 and CR0=0 may correspond to when data having a compression ratio of 25% is transmitted. The case in which CR1=0 and CR=0 may correspond to when data having a compression rate of 25% or below is transmitted. If a compression ratio under 25%, the effect of load reduction by data compression may deteriorate significantly. Accordingly, in this case, compressed data or new data may be transmitted according to a user's setting.

Operation using the control register has been described above in regard of CR0 and CR1 based on a vehicle using the CAN, however, the operation is only exemplary. That is, any other method can be used as long as it can represent information about reconfigured data.

Figure 10A:
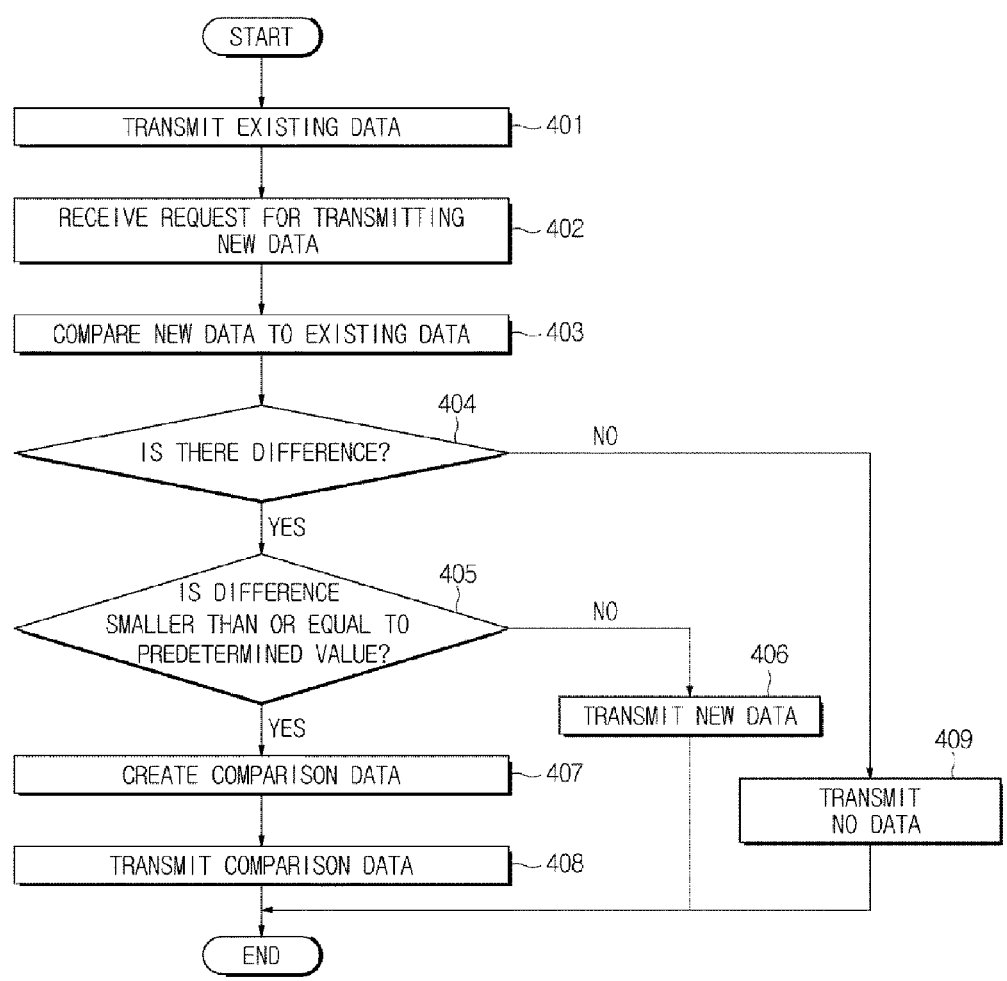
FIG. 10A is a flowchart for describing operation of the first electronic module 101 that transmits data, according to embodiments of the present disclosure.

FIG. 10A is a flowchart for describing operation of the first electronic module 101 that transmits data, according to embodiments of the present disclosure.

Referring to FIG. 10A, the first electronic module 101 may transmit existing data (operation 401), and be requested to transmit new data (operation 402). If the first electronic module 101 receives an input or new data (referred to as "new data") from an external device, the first electronic module 101 may determine whether there is a difference between the new data and the existing data (operations 403 and 404). If the first electronic module 101 determines that there is no difference between the new data and the existing data, the first electronic module 101 may transmit no data (operation 409). If the first electronic module 101 determines that there is a difference between the new data and the existing data, the first electronic module 101 may determine whether the difference is smaller than or equal to a predetermined value (operation 405). If the first electronic module 101 determines that the difference is greater than the predetermined value, the first electronic module 101 may transmit the new data since creating comparison data is meaningless (operation 406). If the first electronic module 101 determines that the difference is smaller than or equal to the predetermined value, the first electronic module 101 may create comparison data (operation 407). The predetermined value may be decided to the size of the new data, however, may be set to an arbitrary value by a user. A method of creating comparison data has been described above in detail, and accordingly a detailed description thereof will be omitted. The first electronic module 101 may transmit the comparison data to the outside (operation 408).

Figure 10B:
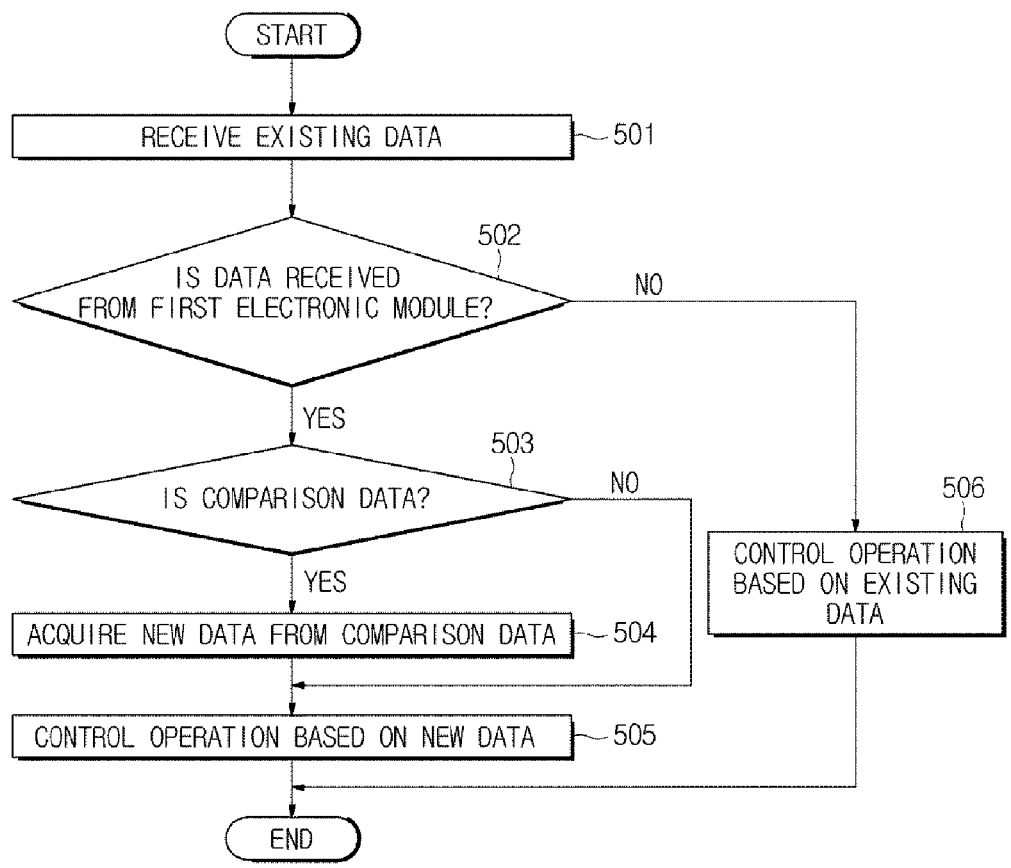
FIG. 10B is a flowchart for describing operation of the second electronic module 102 that receives data, according to embodiments of the present disclosure.

FIG. 10B is a flowchart for describing operation of the second electronic module 102 that receives data, according to embodiments of the present disclosure.

Referring to FIG. 10B, the second electronic module 102 may receive the existing data from the first electronic module 101 (operation 501), and determine whether data is received from the first electronic module 101 (operation 502) and whether the data is comparison data (operation 503). If the second electronic module 102 receives no data after receiving the existing data, this may be a case in which there is no difference between the existing data and new data, and accordingly, the second electronic module 102 may control operation of the vehicle based on the existing data (operation 506). If the second electronic module 102 determines that the data is not comparison data, this may be a case in which new data is received, and accordingly, the second electronic module 102 may control operation of the vehicle based on the new data (operation 505). If the second electronic module 102 determines that the data is comparison data, the second electronic module 102 may acquire new data from the comparison data and the existing data (operation 504). The second electronic module 102 may acquire new data from the comparison data based on the above-described control register. After acquiring new data from the comparison data, the second electronic module 102 may control operation of the vehicle based on the acquired new data (operation 505).

In the in-vehicle communication method and the vehicle according to an aspect, by changing data included in a CAN message to reduce network load without modifying hardware, it is possible to perform stable control operation.

Although select embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A vehicle comprising:
 a first electronic module transmitting one data object of new data and comparison data indicating a difference between the new data and existing data when transmission of the new data is requested;
a second electronic module receiving the comparison data, acquiring the new data from the comparison data, and controlling at least one operation of the vehicle based on the acquired new data; and
a bus transferring data between the first electronic module and the second electronic module.

2. The vehicle according to claim 1, wherein, when there is no difference between the new data and the existing data, the second electronic module controls the at least one operation of the vehicle based on the existing data.

3. The vehicle according to claim 1, wherein the first electronic module calculates the difference between the new data and the existing data.

4. The vehicle according to claim 3, wherein the first electronic module creates the comparison data to include information indicating whether there is a difference between the new data and the existing data and information indicating an amount of the difference when the difference exists.

5. The vehicle according to claim 4, wherein the information indicating whether there is a difference between the new data and the existing data and the information indicating the amount of the difference are stored in a predetermined data field in the comparison data.

6. The vehicle according to claim 4, wherein the first electronic module determines a size of the comparison data according to the amount of the difference.

7. The vehicle according to claim 4, wherein the first electronic module creates the comparison data to include a control register determined according to the amount of the difference.

8. The vehicle according to claim 7, wherein the second electronic module interprets the comparison data including the control register to acquire the new data.

9. The vehicle according to claim 1, wherein each of a data field of the new data, a data field of the existing data, and a data field of the comparison data is a maximum of 64 bits.

10. The vehicle according to claim 1, wherein, when the comparison data is transmitted by the first electronic module a predetermined number of times or more, the first electronic module transmits the new data.

11. An electronic module comprising:
a communication unit communicating with an external electronic module through an in-vehicle communication network; and
a controller controlling operation of the communication unit, causing the communication unit to transmit one data object of new data and comparison data indicating a difference between the new data and existing data when transmission of the new data is requested,
wherein the controller interprets the comparison data to acquire the new data and controls at least one operation of a vehicle based on the acquired new data.

12. The electronic module according to claim 11, wherein, when there is no difference between the new data and the existing data, the controller controls the at least one operation of the vehicle based on the existing data.

13. The electronic module according to claim 11, wherein the controller calculates the difference between the new data and the existing data.

14. The electronic module according to claim 13, wherein the controller creates the comparison data to include information indicating whether there is a difference between the new data and the existing data and information indicating an amount of the difference when the difference exists.

15. The electronic module according to claim 14, wherein the information indicating whether there is a difference between the new data and the existing data and the information indicating the amount of the difference are stored in a predetermined data field in the comparison data.

16. The electronic module according to claim 14, wherein the controller determines a size of the comparison data according to the amount of the difference.

17. The electronic module according to claim 14, wherein the controller module creates the comparison data to include a control register determined according to the amount of the difference.

18. The electronic module according to claim 17, wherein the controller interprets the comparison data including the control register to acquire the new data.

19. The electronic module according to claim 11, wherein, when the comparison data is transmitted by the controller a predetermined number of times or more, the controller transmits the new data.

20. The electronic module according to claim 11, wherein each of a data field of the new data, a data field of the existing data, and a data field of the comparison data is a maximum of 64 bits.

21. A communication method in a vehicle, the method comprising:
transmitting, by a first electronic module, one data object of new data and comparison data indicating a difference between the new data and existing data when transmission of the new data is requested;
receiving, by a second electronic module, the comparison data;
acquiring, by the second electronic module, the new data from the comparison data; and
controlling, by the second electronic module, at least one operation of the vehicle based on the acquired new data,
wherein data is transferred between the first electronic module and the second electronic module using a bus.

* * * * *